T. C. LITTLE.
Automatic Pipe-Holder for Artesian and other Wells.

No. 213,670.  Patented Mar. 25, 1879.

WITNESSES
Henry N. Miller
C. L. Evert

INVENTOR
Thos. G. Little
Alexander Mason
ATTORNEYS

UNITED STATES PATENT OFFICE.

THOMAS C. LITTLE, OF DIXON, ILLINOIS, ASSIGNOR TO FRANK W. LITTLE, OF SAME PLACE.

IMPROVEMENT IN AUTOMATIC PIPE-HOLDERS FOR ARTESIAN AND OTHER WELLS.

Specification forming part of Letters Patent No. 213,670, dated March 25, 1879; application filed December 31, 1878.

*To all whom it may concern:*

Be it known that I, THOS. C. LITTLE, of Dixon, in the county of Lee, and in the State of Illinois, have invented certain new and useful Improvements in Automatic Pipe-Holders for Artesian and other Wells; and do hereby declare that the following is a full, clear, and exact description of the invention, reference being had to the accompanying drawings, and to the letters of reference marked thereon, making a part of this specification.

The nature of my invention consists in the construction and arrangement of an automatic pipe-holder, as will be hereinafter more fully set forth.

In order to enable others skilled in the art to which my invention appertains, to make and use the same, I will now proceed to describe its construction and operation, referring to the annexed drawings, in which—

Figure 1:
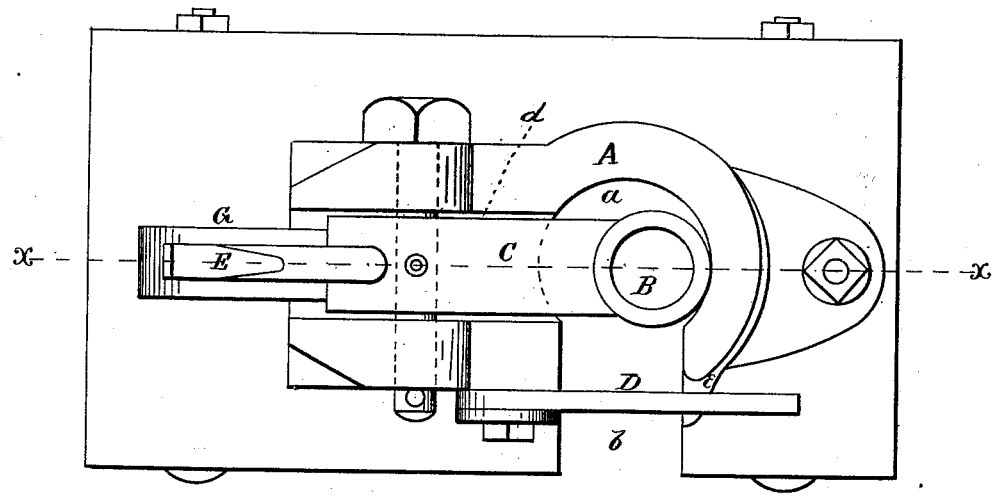
Figure 2:
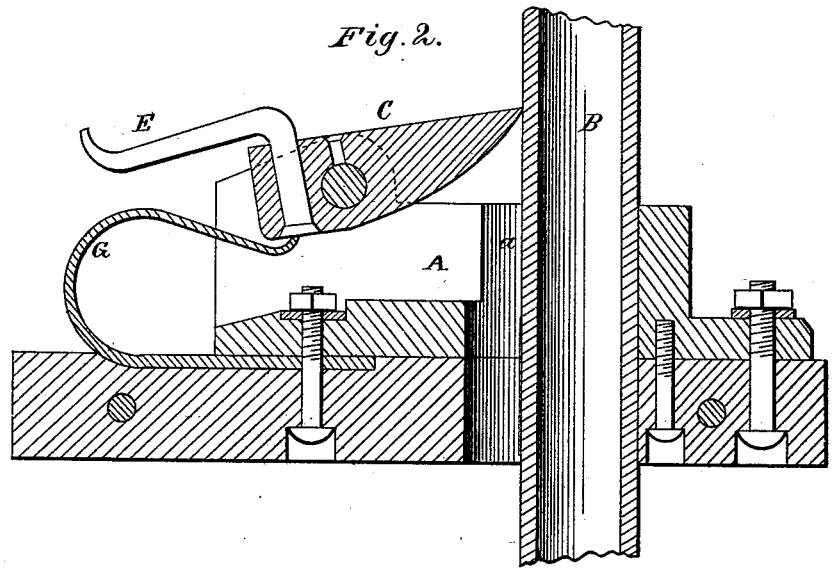

Figure 1 is a plan view of my machine. Fig. 2 is a longitudinal section of the same through the line *x x*, Fig. 2.

A represents a block of suitable size and form, provided with a circular opening, *a*, for the passage up and down of the pipe B through it, and a slot or recess, *b*, from one side of said block into the opening *a* to admit the pipe. This block has also a recess, *d*, back of the circular opening *a* for containing the hinged dog C, and also a slot, *e*, on the side of the block to receive the latch D for closing the recess or slot *a* for the pipe.

The hinged or pivoted dog C is made of steel or hardened iron, and is intended for holding the pipe while coupling or uncoupling the joints of the same, and also while changing the tackle in raising or lowering the pipe. This dog is so formed and secured to the block that its front edge firmly and effectually grasps the pipe, and it is arranged at such an angle that the heavier the pipe is the tighter it is held by the dog, and avoiding all danger of losing the pipe should the tackle required to raise it break, as is often the case.

On the dog C is arranged a lever, E, for raising the dog with the foot and freeing its grasp on the pipe when necessary.

G is a spring, arranged in any suitable manner for pressing the dog against the pipe, thus preventing the dog from being thrown back while lifting the pipe.

The latch D is pivoted to the block A, and closes the slot or recess *b* into the circular opening *a* after the machine is placed around the pipe, and prevents it from being displaced while raising or lowering the pipe. It is well known that it is a difficult and oftentimes dangerous job to put in or take out iron pumps and pipe, particularly in deep wells, from the want of some convenient and safe contrivance for holding the pipe while each joint is being connected or disconnected, and while the tackle is being changed as the pipe is raised or lowered.

The automatic pipe-holder, as constructed, entirely removes that difficulty, and affords a simple, convenient, and safe means for holding the pipe from slipping down, while at the same time it does not obstruct its passage upward, and its cheapness places it within the reach of all who handle pumps and pipes, whether dealers or those who wish as a matter of economy to take up and pack their own pumps.

In putting in a pump, the pump-cylinder, with plunger-rod connected thereto, and one joint of pipe attached, is let down through the platform over the well, leaving the upper end at a convenient height—say, two feet—above the platform, to enable the operator to connect the remaining joints of pipe and rod. The pipe-holder is to be placed on the platform alongside the pipe, the latch is opened, the lever pressed down to allow the holder to be brought up to the pipe through the slot *b*. The pressure is then removed from the dog, which automatically grasps the pipe, and the weight of the pipe below will give it a perpendicular position and hold it firmly while the second joint is screwed on. That being done, the foot of the operator is placed upon the lever, the dog is raised, loosening its grasp upon the pipe, when the latter is again carefully lowered, leaving the upper end some two feet above the platform, as before, when the third joint is screwed on, and so on until all the pipe is put down and the pump screwed on, when the latch and dog are raised, the pipe-holder removed through the slot, and the pump placed upon the platform and put in position. In taking out a pump the operation is reversed. As the pipe is raised the dog loosens its grasp until the pipe is raised to the desired height, when the foot is taken off the lever, the weight of the pipe is thrown upon the dog, it closes upon the pipe and holds it firmly as each joint is taken off, and the whole is taken out without any of the difficulty and danger experienced when the pipe is held by tongs or any of the various temporary devices now in use.

Having thus fully described my invention, what I claim as new, and desire to secure by Letters Patent, is—

1. The block A, constructed as described, with opening $a$, slot $b$, recess $d$, and slot $e$, as and for the purposes herein set forth.

2. The steel or case-hardened iron dog C, constructed as shown, pivoted to the block A, and held to its work by a spring, for the purposes herein set forth.

3. The lever E, attached to the dog C, as and for the purposes herein set forth.

4. The spring G, arranged in connection with the dog C, as and for the purposes herein set forth.

5. The latch D, in combination with the block A, for the purposes herein set forth.

6. The combination of the block A, dog C, lever E, spring G, and latch D, all constructed substantially as and for the purposes herein set forth.

In testimony that I claim the foregoing I have hereunto set my hand this 2d day of November, 1876.

THOMAS C. LITTLE.

Witnesses:
ARTHUR ASHBY,
A. C. STANLEY.